United States Patent [19]

Wilson et al.

[11] Patent Number: 4,671,527
[45] Date of Patent: Jun. 9, 1987

[54] FIFTH WHEEL

[75] Inventors: James A. Wilson, Bacchus Marsh; James R. Ellis, Merrimbula, both of Australia

[73] Assignee: Holland Hitch (AUST.) Ltd., Melton, Australia

[21] Appl. No.: 717,243

[22] PCT Filed: Jul. 12, 1984

[86] PCT No.: PCT/AU84/00132
§ 371 Date: Mar. 14, 1985
§ 102(e) Date: Mar. 14, 1985

[87] PCT Pub. No.: WO85/00331
PCT Pub. Date: Jan. 31, 1985

[30] Foreign Application Priority Data

Jul. 14, 1983 [AU] Australia .............................. PG-0278

[51] Int. Cl.⁴ ............................................. B62D 53/08
[52] U.S. Cl. ................... 280/438 R; 280/407; 298/20 A
[58] Field of Search ............... 280/425 R, 433, 438 R, 280/407, 439; 298/20 A

[56] References Cited

U.S. PATENT DOCUMENTS

| | | | |
|---|---|---|---|
| 2,928,684 | 3/1960 | Geiger | 298/20 A |
| 3,066,956 | 12/1962 | Colorigh | 280/438 R |
| 3,117,804 | 1/1964 | Bistrom | 280/438 R |
| 3,139,289 | 6/1964 | Richler | 298/20 A |
| 3,287,038 | 11/1966 | Candlin | 280/433 |
| 3,337,170 | 8/1967 | Remy | 280/433 |
| 3,552,774 | 1/1971 | Gottler | 280/438 R |
| 4,475,740 | 10/1984 | Strick | 280/438 R |

FOREIGN PATENT DOCUMENTS

| | | | |
|---|---|---|---|
| 1755502 | 8/1971 | Fed. Rep. of Germany | 280/438 R |
| 2542328 | 3/1977 | Fed. Rep. of Germany | 280/438 R |
| 1755798 | 6/1979 | Fed. Rep. of Germany | 280/438 R |
| 3004218 | 8/1981 | Fed. Rep. of Germany | 280/438 R |
| 54-9826 | 1/1979 | Japan | 280/438 R |

Primary Examiner—John J. Love
Assistant Examiner—Everett G. Diederiks, Jr.
Attorney, Agent, or Firm—Kerkam, Stowell, Kondracki & Clarke

[57] ABSTRACT

A fifth wheel assembly (10) comprising a lower support structure (12) adapted to be mounted on the chassis of a prime mover and an upper support plate (13) upon which a trailer is to be supported, and between which a cam operated linkage mechanism is incorporated which has a pair of space apart main link assemblies (14) pivotally attached at one end (19) to the lower support structure and pivotally attached adjacent their other ends (13) to the upper support plate. Cam members (15) are pivotally supported on the link assemblies with their cam surfaces in contact with the lower support structure, whereby rotation of the cam members pivots the link assemblies upwardly about their pivotal connections to the lower support structure to thereby raise the upper support plate attached to the other ends of said link assemblies. A pair of spaced apart strut assemblies (20) are also provided pivotally connected at one end (21) to respective ones of the main link assemblies and detachably connected at their other ends, to the lower support structure via a pin (28) extending through a number of alternative arrangements of aligned holes (23, 24, 25, 26, 27), and such as to hold said upper support plate relative to the lower support structure in one of a number of alternative positions.

4 Claims, 5 Drawing Figures

FIFTH WHEEL

TECHNICAL FIELD

This invention relates to a fifth wheel or turntable for an articulated vehicle, such as a semi-trailer, and more particularly relates to an adjustable height fifth wheel.

BACKGROUND ART

The height of the chassis for some makes of prime-movers differ from other makes, whilst the height of trailers also varies. It is also common practice for prime-movers to be coupled to a variety of trailers over a period of time in mixed fleet situations, rather than there being a continuing prime-mover/trailer combination. With such operating requirements the use of static fifth wheels will not ensure a relatively level load supporting surface on the trailer.

In the past mechanisms to enable adjustment of the height of the fifth wheel to deal with the above problems have necessitated hydraulic and pneumatic lifting arrangements all of which are costly.

DISCLOSURE OF THE INVENTION

It is therefore an object of the present invention to provide a fifth wheel assembly for mounting on a prime-mover and incorporating a relatively inexpensive and easily operated elevating mechanism.

The invention therefore envisages a fifth wheel assembly comprising a lower support structure adapted to be mounted on the chassis of a prime-mover and an upper support plate upon which a trailer is to be supported, wherein between said support structure and said support plate a cam operated linkage mechanism is incorporated to raise and lower the upper support plate relative to the lower support structure, and wherein detachable means are provided to hold the upper support plate relative to said lower support structure in one of at least two alternative positions.

BRIEF DESCRIPTION OF THE DRAWINGS

One embodiment of the invention will now be described with reference to the accompanying drawings in which.

BEST MODE FOR CARRYING OUT THE INVENTION

Figure 1:
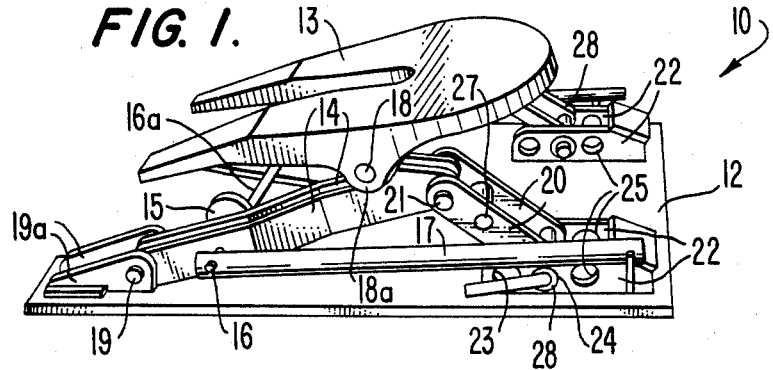
FIG. 1 is a perspective view of the assembly of this preferred embodiment.

Referring to the drawings the fifth wheel assembly designated as 10, comprises a lower support structure 12 and an upper support plate 13 as are conventional for fifth wheel assemblies. Incorporated between the structure 12 and the support plate 13 is a cam and linkage assembly incorporating a pair of spaced apart main link assemblies 14 pivotally mounted at 19 on the support structure 12 and between a pair of upstanding support lugs 19a as shown. A pair of cam members 15 are rotatably supported on each of the link assemblies 14 and carried by pivot shafts 16 through the link assemblies 14. The peripheral surfaces of the cam members 15 engage the support structure 12 such that when rotated by the handles 17, fixed to the other ends of the pivot shafts 16, the link assemblies will pivot up and down to raise and lower the support plate 13 to which portions 18b of the link assemblies towards the opposite ends thereof are pivotally connected at 18 between a pair of lugs 18a extending downwardly from beneath generally diametrically opposed edge portions of the support plate 13. As shown a common connecting bar 16a may be coupled between the cam members.

Additional link assemblies 20 acting as struts are pivotally connected at 21 to the extreme ends of the link assemblies 14, or alternatively to said upper support plate, with the lower ends of the additional assemblies 20 interlocking in a number of positions with a pair of spaced apart locating bars 22 supported on the support structure 12 and having in this case three aligned pairs of holes 23, 24 and 25 therethrough adapted to align with one or the other of a pair of holes 26 and 27 in the additional link assemblies with a locating pin 28 with handle being inserted through the aligned holes for each location to hold the assembly at that location.

Figure 2:
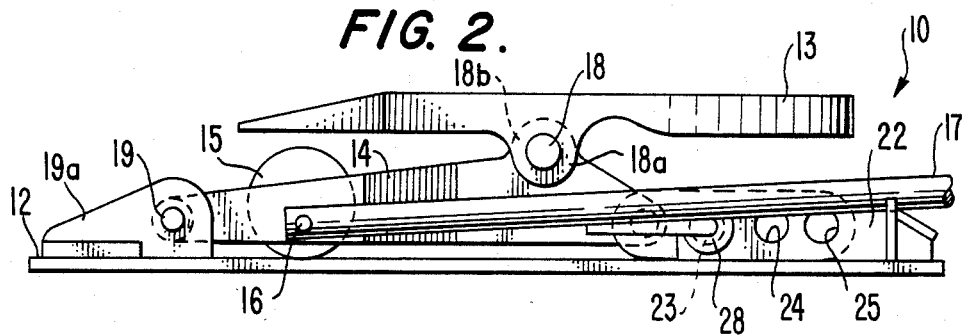
FIG. 2 is a side elevational view of the assembly of FIG. 1 showing the assembly in its lowest height position.

At the lowest height of the assembly for the fifth wheel and as shown in FIG. 2, the holes 23 in the locating bar and the holes 27 in the link assemblies are aligned and the locating pins 28 inserted.

In a first elevated position (not shown), the holes 26 in the link assembly are aligned with the holes 25 in the locating bars, and locating pins 28 inserted.

Figure 3:
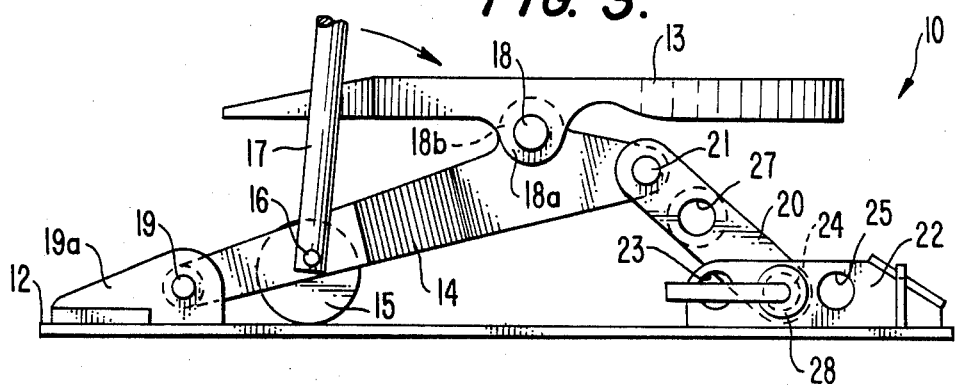
FIG. 3 is a side elevational view of the assembly in one of a pair of intermediate height positions.

In the second elevated position as shown in FIG. 3, the holes 26 in the link assemblies are aligned with the holes 24 in the locating bars, and locating pins 28 inserted.

Figure 4:
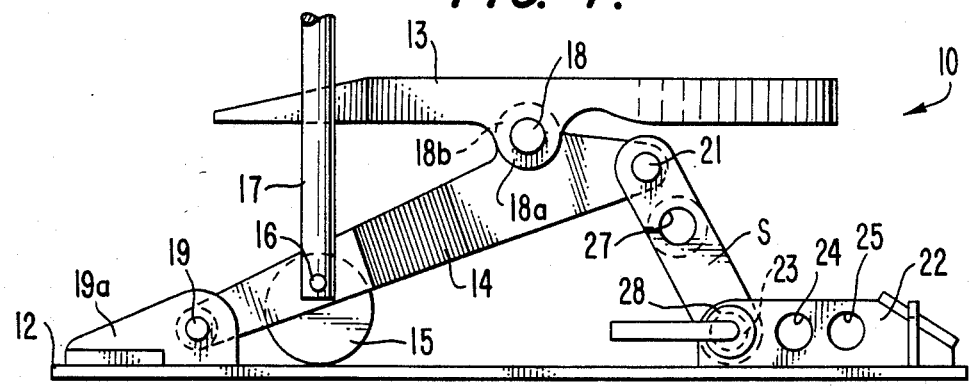
FIG. 4 is a side elevational view of the assembly in its highest height position.
Figure 5:
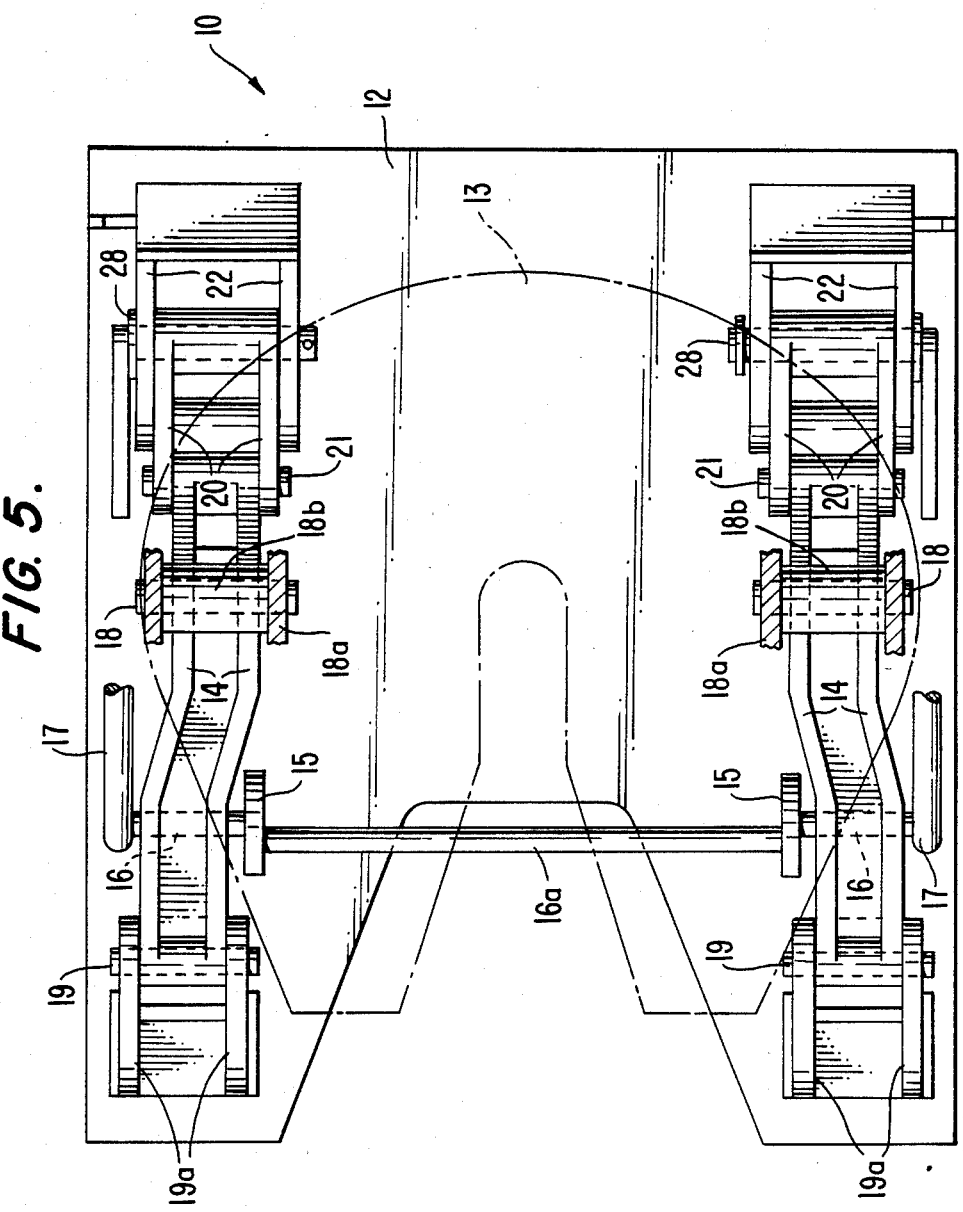
FIG. 5 is a plan view of the assembly of the previous figures.

In the third or highest elevated position as shown in FIG. 4, the holes 26 in the link assemblies are aligned with the holes 23 in the locating bars, and locating pins 28 inserted.

At any position, after insertion of the locating pins 28, the cam member 15 and their handles 17 can be swung back down to the positions shown in FIGS. 1 and 2.

We claim:

1. A fifth wheel assembly comprising a lower support structure adapted to be mounted on the chassis of a prime mover and an upper support plate upon which a trailer is to be supported, wherein between said support structure and said support plate a linkage mechanism is incorporated and has a cam member eccentrically mounted for rotation about an axis extending transversely of the linkage mechanism with its peripheral surface engaging the lower support structure whereby, when rotated in one direction, the distance between the rotation axis and the point of engagement with said lower support structure progressively increases to extend the linkage mechanism, whereas, when rotated in the opposite direction, the said distance decreases to retract the linkage mechanism, such that the upper support plate is raised and lowered relative to the lower support structure, and wherein detachable means are provided to hold the upper support plate relative to said lower support structure in one of at least two alternative positions.

2. A fifth wheel assembly as claimed in claim 1, wherein said linkage mechanism comprises a pair of spaced apart main link assemblies pivotally attached at one end to the lower support structure and pivotally attached adjacent their other ends to said upper support plate, said cam member being pivotally supported on at least one of said link assemblies.

3. A fifth wheel assembly as claimed in claim 2, wherein said detachable means comprises a pair of spaced apart strut assemblies pivotally connected at one end to respective ones of said main link assemblies, and detachably connected to said lower support structure to hold said upper support plate relative to said lower support structure in one of at least two alternative positions.

4. A fifth wheel assembly as claimed in claim 3, wherein said strut assemblies cooperate with locating members supported on said lower supporting structure and holes through said strut assemblies and said locating members are provided whereby upon alignment of selective holes and insertion of a locating pin said strut assemblies will hold said upper support plate relative to said lower support structure in said one of at least two alternative positions.

* * * * *